(No Model.)

W. TURNER.
PNEUMATIC TIRED WHEEL.

No. 520,504. Patented May 29, 1894.

WITNESSES:

INVENTOR:
W. Turner
Per Robt. Cd. Phillips
Attorney.

THE NATIONAL LITHOGRAPHING COMPANY,
WASHINGTON, D. C.

UNITED STATES PATENT OFFICE.

WALTER TURNER, OF LONDON, ENGLAND.

PNEUMATIC-TIRED WHEEL.

SPECIFICATION forming part of Letters Patent No. 520,504, dated May 29, 1894.

Application filed July 28, 1893. Serial No. 481,780. (No model.) Patented in England December 22, 1892, No. 23,641.

*To all whom it may concern:*

Be it known that I, WALTER TURNER, a subject of the Queen of Great Britain, residing at Maida Vale, London, in the county of Middlesex, England, have invented a new and useful Improvement in Pneumatic-Tired Wheels, (for which I have obtained a patent in Great Britain, No. 23,641, bearing date December 22, 1892,) of which the following is a specification.

My invention relates to an improved construction of pneumatic tired wheel, and it consists in making the rim of the wheel—which may be either hollow or solid—with a flat bottomed groove in its outer face, so fashioned that its circumference at one side is greater than its circumference at the opposite side, the flanges or sides of the rim being of the same external diameter, and in making the cover of the tire—which is arch-shape in cross section and adapted to be fixed to the wheel rim by bands or wires—with its one edge deeper than the other to correspond with the increased depth of the groove in the rim on one side thereof, the band or wire in or engaging with the edge of the cover adapted to fit in the side of the groove in the rim which is of the smaller circumference being provided with any suitable device for contracting its length to bind the said edge of the cover to the rim, and the band or wire in the other edge of the cover being made endless in the form of a hoop or ring so that this edge of the cover is unstretchable, the object being to facilitate the removal of the cover from the wheel rim for the purpose of getting at the air tube. I attain this end in the manner shown in the accompanying drawings, in which—

Figure 1:
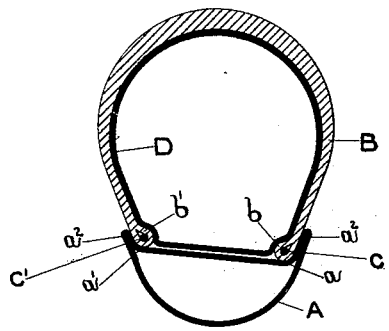
Figure 2:
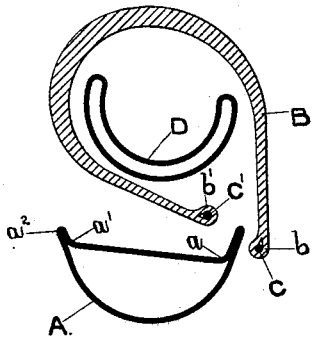
Figure 3:
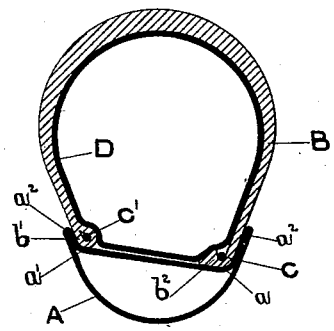
Figure 4:
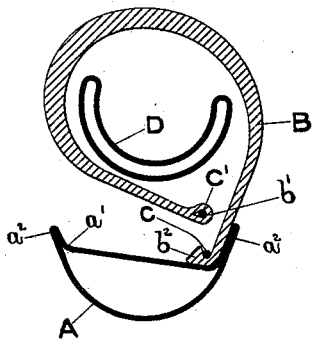

Figure 1 is a view in transverse section of a wheel rim and tire constructed according to my invention, and Fig. 2 is a view in transverse section of a wheel rim and tire showing how the cover is removed from the wheel rim. Fig. 3 is a view in transverse section showing a modification in the method of attaching the cover to the wheel rim. Fig. 4 is a similar view showing how it is removed therefrom. Figs. 5, 6, 7, and 8 are views in transverse section showing other methods of constructing the wheel rim.

Throughout the several views similar parts are marked with like letters of reference.

Figure 5:
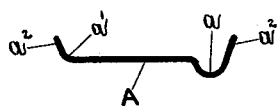
Figure 6:
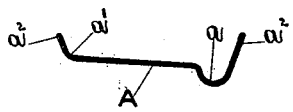
Figure 7:
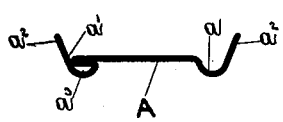
Figure 8:

The rim A of the wheel—which may be either hollow as shown by Figs. 1, 2, 3, 4, and 8, or solid as shown by Figs. 5, 6, and 7—is made with a flat or approximately flat bottomed groove, the one side $a$ of the groove being deeper, *i. e.*, of a smaller diameter than at the other side $a'$, the flanges $a^2$, $a^2$, being of the same external diameter. The groove of the rim may be made deeper at the side $a$ than at the side $a'$ either by tapering the face of the groove from the side $a'$ to the side $a$ as shown by Figs. 1, 2, 3, and 4, or by making a channel $a$ at one side of the rim, the external circumference of which is smaller than that of the other side $a'$ of the groove as shown by Figs. 5 and 7, or as a modification the channel $a$ may be used with a slightly tapered bottom to the groove as shown by Fig. 6, or with a partly tapered and partly flat bottomed groove as shown by Fig. 8. When a solid rim is made with the channel $a$ in it, I prefer to make the external part of the rim symmetrical by forming a bead $a^3$ on the side $a'$ of the rim equivalent to the exterior form of the rim on the channeled side $a$.

The cover B of the tire is made of rubber reinforced with canvas in the well-known manner and it is molded or otherwise formed with one of its edges $b$ deeper than its other edge $b'$ as shown by Figs. 1 and 2. In the edges $b$ and $b'$ of the cover are formed pockets adapted to receive or contain bands or wires C and C', the band or wire C in the edge $b$ of the cover B is made expansible and contractible in length by means of any suitable device such as a right and left hand coupling nut. As a modification the band or wire C may simply engage with a bead $b^2$ formed on the edge $b$ of the cover as shown by Figs. 3 and 4, in which case the fastening of the said band or wire is got at from the interior of the tire by pressing over the edge $b'$ of the cover as shown by Fig. 4. The air tube D is of the usual construction made of rubber, and is provided with any suitable form of valve for inflation and deflation.

The circumference of the endless band or wire C' is such that it cannot be passed over the flange $a^2$ on the side $a'$ of the rim, and therefore the edge $b'$ of the cover cannot be got off the rim on that side. The circumference of the groove of the rim at the side $a$ however is so much less than that at the side $a'$ that the wired edge $b'$ of the cover can be got off the rim on the side $a$ thereof after the edge $b$ of the cover has been detached by placing the wired edge $b'$ of the cover eccentric with the edge of the flange $a^2$ on the side $a$ of the rim. It will be seen that under no circumstances can the edge $b'$ of the cover—having the endless band or wire $C'$—be passed over the flange of the rim on the side $a'$ against which it fits, and that under no circumstances can the edge $b'$ of the cover be removed from or replaced on the rim except over the flange on the side $a$ of the rim.

I wish it to be particularly understood that I do not limit myself to the precise details of construction hereinbefore described and illustrated by the accompanying drawings, but that I hold myself at liberty to make such changes and alterations as fairly fall within the spirit and scope of my invention.

I am aware that it is not broadly new to use two bands or wires for attaching the covers of pneumatic tires to wheel rims, and I make no broad claim therefor, but Having now particularly described and ascertained the nature of my said invention and in what manner the same is to be performed, I declare that what I desire to secure by Letters Patent is—

1. A wheel rim for a pneumatic tire consisting of a flat bottom and of two side flanges, the bottom of the rim being at a slight angle with the axis of the rim so that it slopes from one side to the other and has therefore a greater diameter at one side than the other, as and for the purpose set forth.

2. A wheel rim for a pneumatic tire consisting of a flat bottom and of two sides or flanges, the bottom of the rim being at a slight angle with the axis of the rim so that it slopes from one side to the other, the two flanges or sides being of the same external diameter, as and for the purpose set forth.

3. In a pneumatic tired wheel, the combination of a grooved rim having a flat bottom deeper at one side than at the other, of a cover or jacket having one edge of a larger circumference than the other, each edge having a pocket in which are located fixing bands or wires, the band or wire in the edge of the cover of the larger circumference being an endless hoop, and that in the edge of the cover of the smaller diameter being expansible and contractible, and of an air tube adapted to inflate the tire, as set forth.

4. In a pneumatic tired wheel, the combination of a rim having a flat bottomed groove having a channel at one side thereof of a smaller circumference than the flat bottom of the groove, of a cover or jacket having one edge of a larger circumference than the other, each edge having a pocket in which are located the binding bands or wires, the band or wire in the edge of the cover of the larger circumference being an endless hoop and that in the edge of the cover of the smaller diameter being expansible and contractible, and of an air tube adapted to inflate the tire, as set forth.

5. In a pneumatic tired wheel, the combination of a grooved rim having a flat bottom deeper at one side than at the other, of a cover or jacket the one edge of which is of a larger circumference than the other and has a pocket formed in it in which is located an endless fixing band or wire and the other edge of which has a bead or enlargement with which an expansible and contractible fixing band or wire engages, and of an air tube adapted to inflate the tire, as set forth.

WALTER TURNER.

Witnesses:
  W. H. JAMES,
  W. M. HARRIS.